US011801811B2

(12) United States Patent
Redaelli et al.

(10) Patent No.: US 11,801,811 B2
(45) Date of Patent: Oct. 31, 2023

(54) WHEEL CHOCK DEVICE FOR ROAD VEHICLES

(71) Applicant: Reco S.r.l., Osnago (IT)

(72) Inventors: Guido Redaelli, Osnago (IT); Davide Gianni Mario Galletti, Osnago (IT)

(73) Assignee: Reco S.r.l., Osnago (IT)

( * ) Notice: Subject to any disclaimer, the term of this patent is extended or adjusted under 35 U.S.C. 154(b) by 282 days.

(21) Appl. No.: 17/227,637

(22) Filed: Apr. 12, 2021

(65) Prior Publication Data

US 2021/0323513 A1 Oct. 21, 2021

(30) Foreign Application Priority Data

Apr. 15, 2020 (IT) .......................... 102020000007945

(51) Int. Cl.
*B60T 3/00* (2006.01)
(52) U.S. Cl.
CPC ..................................... *B60T 3/00* (2013.01)
(58) Field of Classification Search
CPC ........... B60T 3/00; B60P 3/077; B65G 69/005
See application file for complete search history.

(56) References Cited

U.S. PATENT DOCUMENTS

| | | | | |
|---|---|---|---|---|
| 2,240,512 A | * | 5/1941 | Morgensen, Jr. ......... | B64F 1/16 188/32 |
| 2012/0163938 A1 | * | 6/2012 | Anderson ............... | B61D 3/188 410/30 |
| 2013/0183115 A1 | | 7/2013 | Anderson et al. | |
| 2016/0039394 A1 | | 2/2016 | Galletti et al. | |

FOREIGN PATENT DOCUMENTS

| DE | 935 231 C | 11/1955 | |
|---|---|---|---|
| GB | 2083419 A | * 3/1982 | ................ B64F 1/12 |

OTHER PUBLICATIONS

Research Report dated Dec. 9, 2020 in corresponding Italian application No. 2020000007945; 8 pages.

* cited by examiner

*Primary Examiner* — Melanie Torres Williams
(74) *Attorney, Agent, or Firm* — Maier & Maier, PLLC

(57) ABSTRACT

A wheel chock including a wedge-shaped body defined by at least one substantially flat wall for resting against a ground and at the top, at least one wall for bearing against a wheel, inclined with respect to the wall for resting against the ground, the wall for bearing against the wheel adjoining the wall for resting against the ground at a tip of the wedge-shaped body, the wall for bearing against the wheel including a blocking portion distal from the tip, configured to block a movement of the wheel, and a wheel receiving portion proximal to the tip, further including at least one breakage element constrained to the wedge-shaped body to interfere with a wheel engaged against the blocking portion of the wall for bearing against the wheel, the at least one breakage element configured to partially irreversibly deform when a wheel engages the blocking portion of the wedge-shaped body.

18 Claims, 4 Drawing Sheets

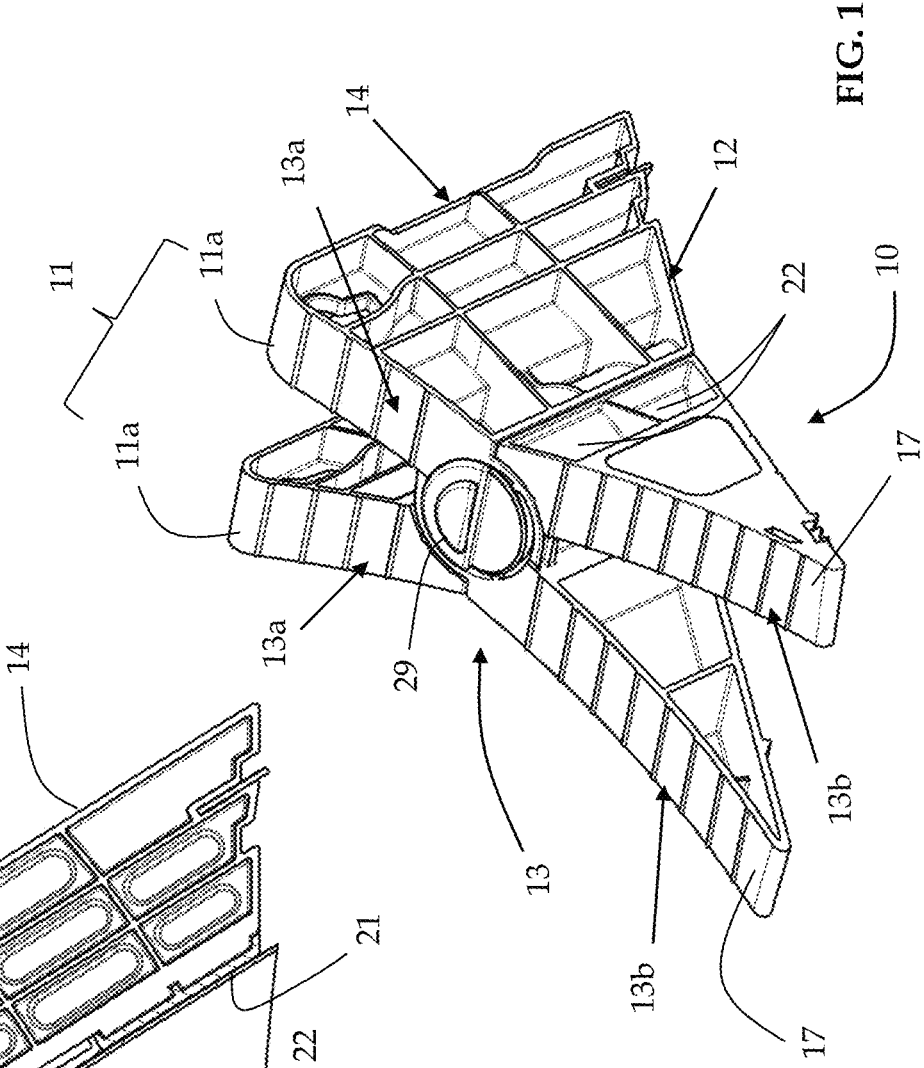
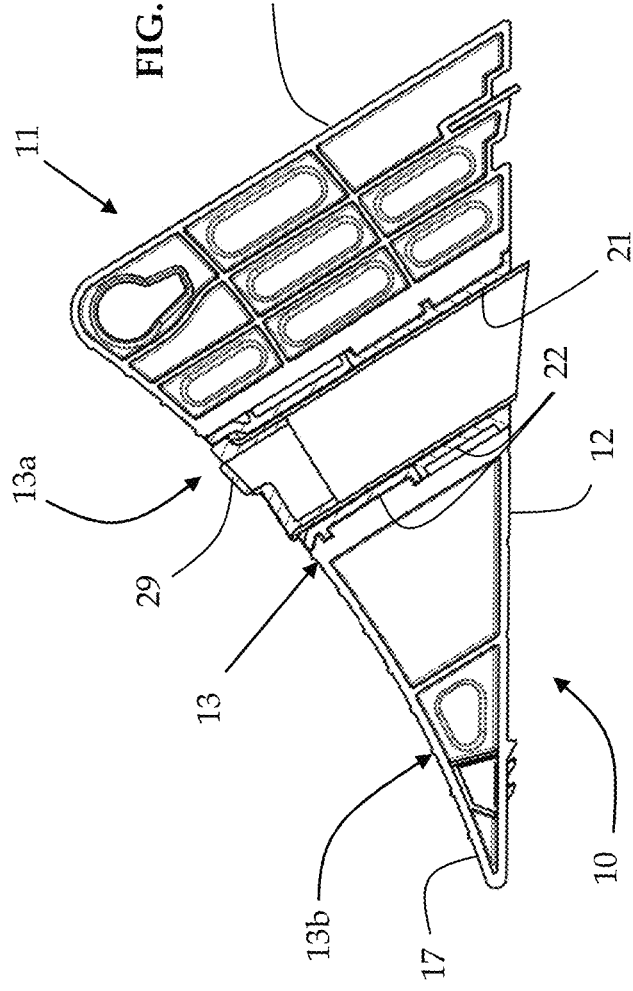
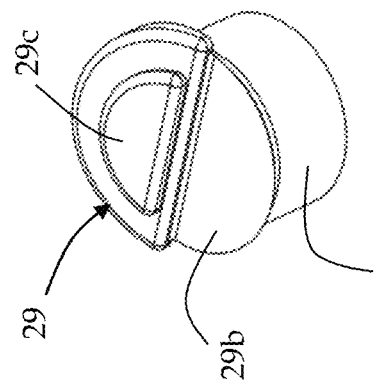

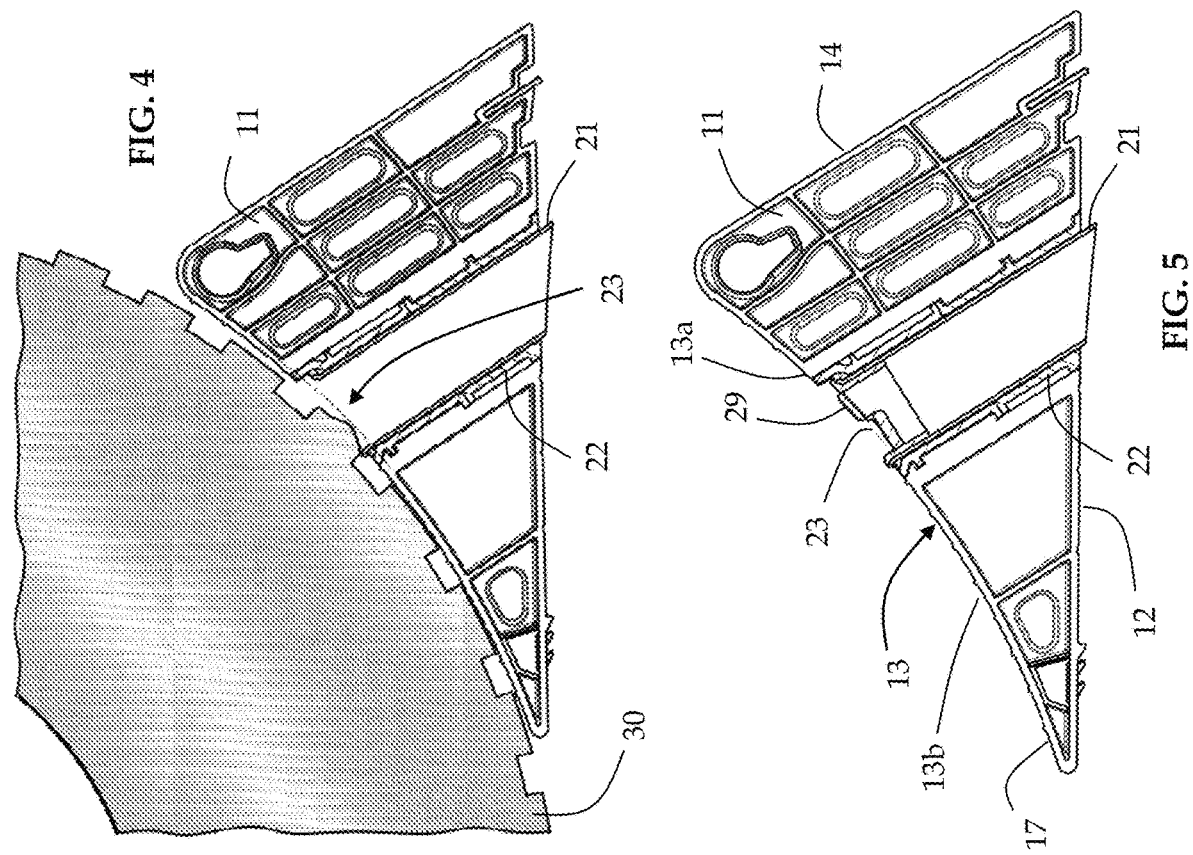

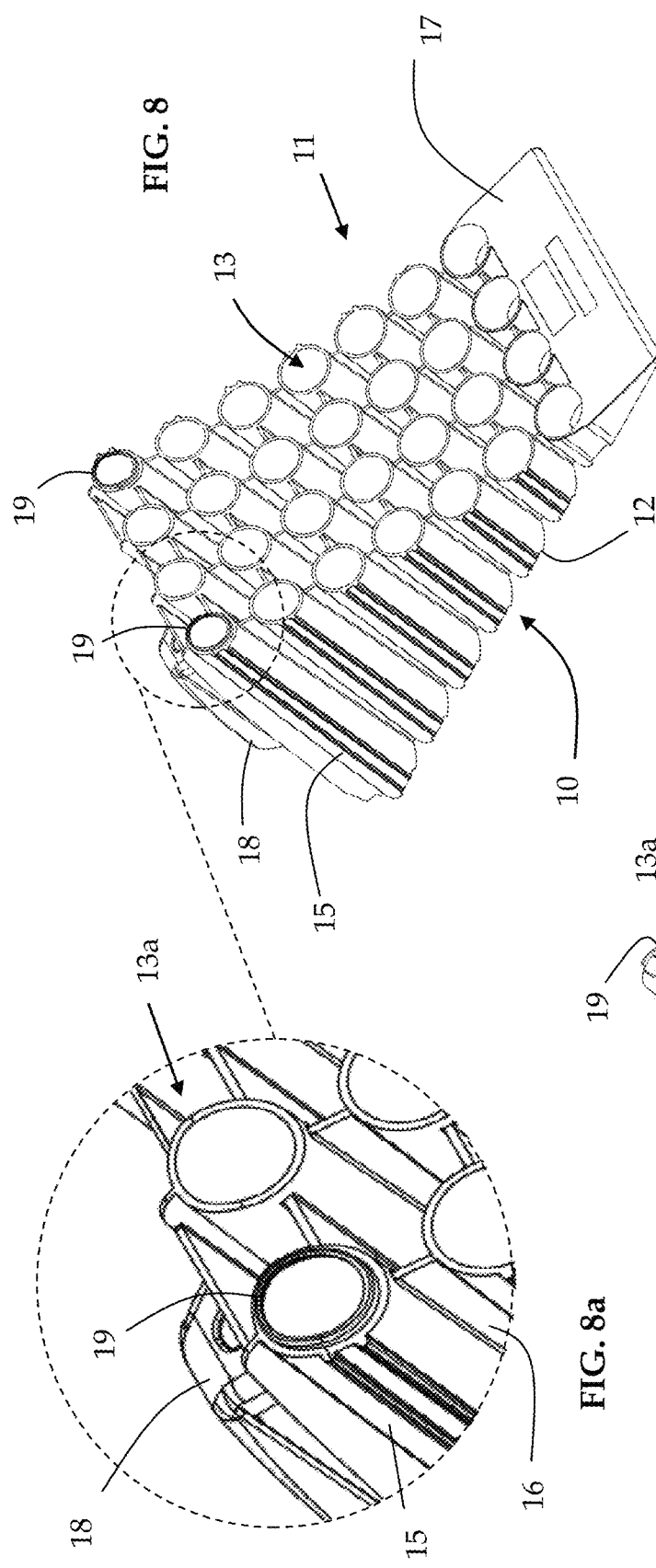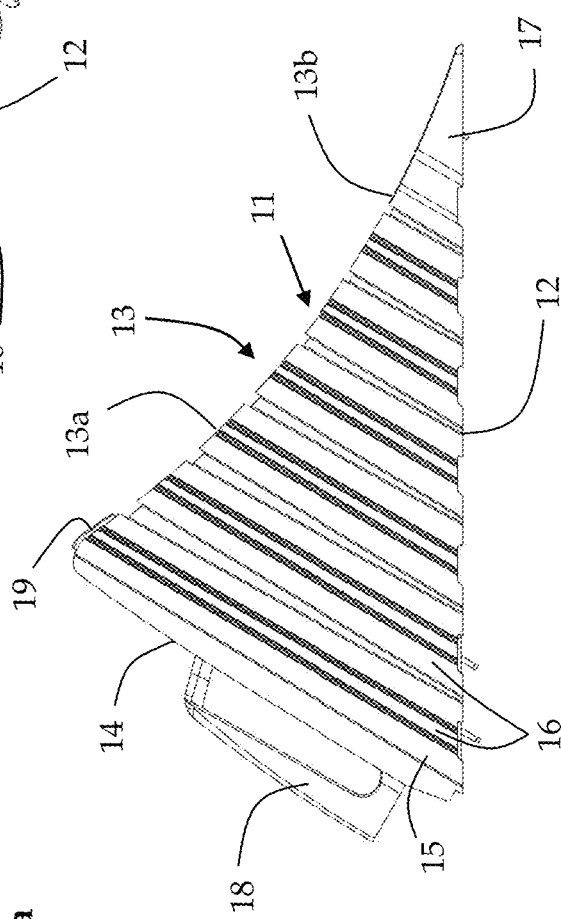

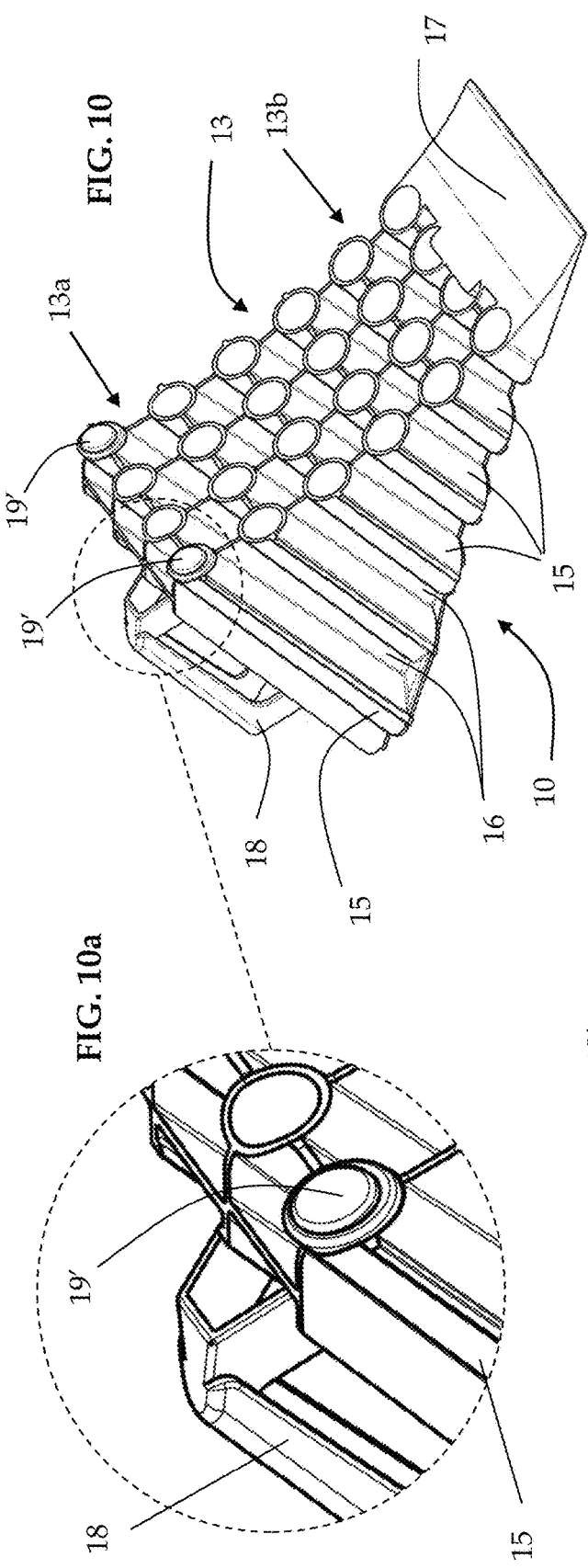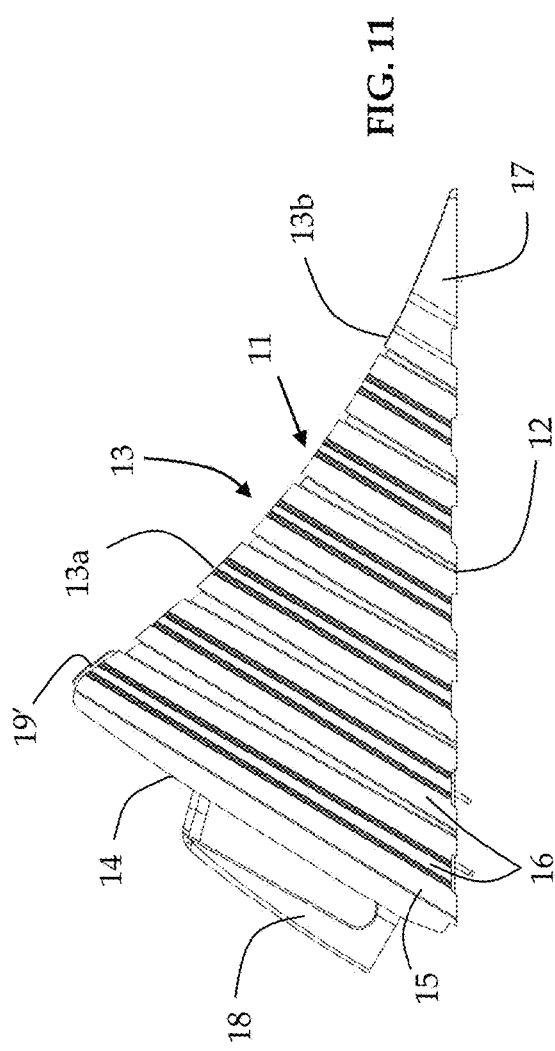

WHEEL CHOCK DEVICE FOR ROAD VEHICLES

TECHNICAL FIELD

The present invention relates in general to a wheel chock device usually used to ensure the stopping of road vehicles, in particular heavy road vehicles such as, for example, trucks, articulated trucks, buses and so on. Specifically, the present invention relates to wheel chock devices capable of signalling their degree of use.

BACKGROUND

A "wheel chock device" or "wheel chock wedge" is known to refer to wedge-shaped devices configured to be placed on the ground and pressed against a portion of a wheel of a stationary vehicle in order to prevent undesirable movement thereof. These devices are generally used to ensure that the vehicle is stopped while stationary, even in case the parking brake fails.

The wheel chock devices are defined in detail in the German standard no. DIN76051—part 1 which is widely referred to in the industry. Specifically, wheel chock devices are configured to transform a rotational movement of a wheel into a force exerted transversely to the ground. This prevents the wheel chock device from slipping on the bearing surface thereof, e.g. a road or the ground.

In general terms, wheel chock devices comprise a flat lower base suitable for being positioned on the ground and a bearing wall that can be rested to the rear and/or front side of a wheel and configured to prevent the wheel from sliding along the wheel, for example through a curved conformation or a steep inclination relative to the lower base.

In the present state of the art, it is widely accepted to use wheel chock devices made of plastic material which offer the best compromise between strength and weight of the wheel chock device.

The Applicant noted that a particular need in the context of, but not limited to, wheel chock devices made of plastic is to determine whether the device has been subjected to significant stress, which could require replacement of the device.

Generally, the wheel chock devices are placed against a wheel, but are not actually subjected to stress, since the vehicle is normally braked by the action of the parking brake. If, however, the brake is defective or is not activated, the wheel engages the wheel chock device, putting it under stress. Such a stress may lead to failures which could jeopardise the proper functioning of the wheel chock device in the future.

The Applicant has also pointed out that in case of a wheel chock device made of plastic material, possible failures are difficult to infer from a simple observation of the part. In fact, once the stress has ended, the resin or plastic part tends by its nature to return elastically to the initial configuration without, however, guaranteeing the same resistance characteristics as the product without failures.

In general terms, the Applicant has found that in a number of industries there is a requirement that plastic devices intended to provide safety performance be subject to periodic inspections to verify that their use has not compromised their initial performance.

SUMMARY

In view of the foregoing, the problem underlying the present invention is to devise a wheel chock device having increased reliability of operation.

In the context of this problem, an aim of the present invention is to realize a wheel chock device which allows to infer the degree of use or the functionality condition of the device in a simple and safe way.

Moreover, it is an object of the present invention to devise a wheel chock device able to signal the risk of non-integrity of the device, due to a previous use under stress, and therefore the need to be replaced.

Not least, it is an object of the present invention to obviate the need for frequent inspections aimed at verifying the performance of the wheel chock device.

According to a first aspect thereof, the invention thus relates to a wheel chock device comprising a wedge-shaped body defined below by at least one substantially flat wall for resting against a ground and at the top, by at least one wall for bearing against a wheel, inclined with respect to the wall for resting against the ground, the wall for bearing against the wheel adjoining the wall for resting against the ground at a tip of the wedge-shaped body. The wall for bearing against the wheel comprises a blocking portion distal from the tip, configured to block a movement of the wheel, and a wheel receiving portion proximal to the tip.

According to the present invention, the wheel chock device comprises at least one breakage element constrained to the wedge-shaped body so as to interfere with a wheel engaged against the blocking portion of the wall for bearing against the wheel, the at least one breakage element being configured to at least partially irreversibly deform when a wheel engages the blocking portion of the wedge-shaped body.

The Applicant has identified that there are areas of the wall for bearing against the wheel of the wheel chock device that are engaged by the same only when the device is actually placed under stress, for example when the parking brake is not activated or is faulty.

The Applicant has therefore devised to arrange a breakage element at those portions of the wall which are engaged only when the wheel chock device is placed under stress. The breakage element is specially configured to yield or deform irreversibly once subjected to the compressive load exerted by the wheel so as to be able to signal, through its own deformation/breakage, that this specific portion of the wall has been engaged and that therefore the wheel chock device has been subjected to stress and may therefore no longer operate reliably.

The solution devised by the Applicant solves a long-standing problem in a simple and effective manner, creating a sort of indicator of intensive use of the wheel chock device which could indicate the need to replace it. This increases the reliability and safety of the wheel chock device.

The present invention may have at least one of the following preferred features; the latter may in particular be combined with one another as desired in order to meet specific application needs.

In a variant of the invention, the breakage element is constrained or integrated in the blocking portion of the wall for bearing against the wheel.

In particular, the breakage element is constrained or integrated in the blocking portion of the wall for bearing against the wheel in a manner protruding from a surface of maximum penetration depth of a wheel into the wedge-shaped body, or preferably in a manner protruding from the wall for bearing against the wheel.

In a variant of the invention, the at least one breakage element is characterized by a compressive breaking load comprised between 35 kg and 150 kg, preferably between 40 kg and 110 kg.

In a variation of the invention, the blocking portion of the wall for bearing against the wheel distal from the tip extends at least two-thirds of the wall for bearing against the wheel.

Preferably, the blocking portion extends for at least half of the wall for bearing against the wheel.

In a variant of the invention the wedge-shaped body comprises a plurality of elongated support structures which extend between the wall for resting against the ground and the wall for bearing against the wheel, a first end of the support structures contributing to form the wall for bearing against the wheel, the at least one breakage element being made as an extension of at least one support structure whose end contributes to form the blocking portion of the wall for bearing against the wheel.

Preferably, the extension of the at least one support structure is made as a membrane, capsule or ferrule.

Preferably, the at least one breakage element is made as an extension of the at least one support structure adjoining a back wall of the wedge-shaped body.

More preferably, the back wall has a convergent inclination towards the wall for bearing against the wheel.

Alternatively, the back wall is orthogonal to the wall for resting against the ground.

Preferably, the at least one breakage element is made as an extension of at least two support structures whose end contributes to forming the blocking portion of the wall for bearing against the wheel.

Preferably, the elongated support structures are arranged side-by-side parallel to each other and joined to adjoining support structures by means of connecting walls advantageously extending parallel to and for nearly the entire extension of the support structures.

Preferably, the at least one breakage element is made in one piece with at least one support structure and as an annular extension of said at least one support structure.

Alternatively or additionally, the at least one breakage element is made as a closure insertable into the first end of the at least one support structure, with the at least one support structure made as a hollow tubular element.

In a variant of the invention, the wedge-shaped body comprises two body sections fastened to each other in a rotatable manner around the same pivot element so as to be movable between a first close configuration, in which they outline a compact wedge-shaped body, and a second spaced-apart configuration, in which they outline an extended wedge-shaped body, the pivot element extending between the wall for resting against the ground and the wall for bearing against the wheel of each body section and with a first termination reaching the wall for bearing against the wheel at the blocking portion, the breakage element being constrained to the pivot element.

Preferably, the breakage element is made as a closure or as an insert provided with an axial through opening, the breakage element being insertable into the first termination of the pivot element, with the pivot element made as a hollow cylinder.

More preferably, the breakage element comprises a cylindrical body with a section complementary to a section of the pivot element and an upper cap configured to abut against the termination of the pivot element which reaches the wall for bearing against the wheel.

Even more preferably, the upper cap comprises at least one protrusion configured to extend beyond a surface defined by the maximum penetration depth of a wheel inside the pivot element.

Even further preferably, the upper cap comprises at least one protrusion configured to extend beyond to the wall for bearing against the wheel when the breakage element is inserted in the pivot element.

Even further preferably, the protrusion develops on an upper cap half positioned further away from the receiving portion.

Preferably, the at least one protrusion is made as a membrane, capsule or ferrule.

Preferably, the at least one protrusion has a perimeter conformation and contours an opening that develops for an upper cap half positioned further away from the receiving portion.

Preferably, the at least one breakage element comprises non-releasable constraint means configured to ensure connection thereof to the wedge-shaped body.

BRIEF DESCRIPTION OF THE DRAWINGS

Further characteristics and advantages of the present invention will be more evident from the following description of some preferred embodiments thereof made with reference to the appended drawings.

The different features in the individual configurations can be combined with each other as preferred according to the previous description, should it be necessary to avail of the advantages resulting specifically from a particular combination.

In Such Drawings,

FIG. 1 is a perspective view of a wheel chock device according to an embodiment of the present invention;

FIG. 2 is a partial cross-sectional view of the wheel chock device of FIG. 1;

FIG. 3 is a perspective view of the breakage element used in the wheel chock device of FIG. 1;

FIG. 4 is a partially sectional representation of a wheel chock device according to the state of the art represented in engagement with a wheel tyre;

FIG. 5 is a partially sectional view of a wheel chock device according to a second embodiment of the present invention;

FIG. 6 is a perspective view of alternative breakage elements that can be used in the wheel chock device according to the embodiments of FIG. 1 and FIG. 5;

FIG. 7 is a perspective view of alternative breakage elements that can be used in the wheel chock device according to the embodiments of FIG. 1 and FIG. 5;

FIGS. 8 and 8a are respectively a perspective view and a relative enlarged detail of a wheel chock device according to a third embodiment of the present invention;

FIG. 9 is a side elevation view of the wheel chock device of FIG. 8;

FIGS. 10 and 10a are respectively a perspective view and a relative enlarged detail of a wheel chock device according to a fourth embodiment of the present invention;

FIG. 11 is a side elevation view of the wheel chock of FIG. 10.

DETAILED DESCRIPTION OF THE EMBODIMENTS

In the following description, for the illustration of the figures, identical numbers or reference symbols are used to indicate construction elements with the same function. Further, for illustration clarity, some references may not be repeated in all the figures.

While the invention is susceptible to various modifications and alternative constructions, certain preferred embodiments are shown in the drawings and are described hereinbelow in detail. However, it is to be understood that there is no intention to limit the invention to the specific embodiment illustrated but, on the contrary, the invention intends to cover all the modifications, alternative and equivalent constructions that fall within the context of the invention as defined in the claims.

The use of "for example", "etc", "or" indicates non-exclusive alternatives without limitation unless otherwise indicated. The use of "comprises" and "includes" means "comprises or includes, but not limited to", unless otherwise indicated.

With reference to FIGS. 1-3, a first embodiment of a wheel chock device according to the present invention is shown, altogether denoted with 10.

The wheel chock device 10 comprises a wedge-shaped body 11 defined below by a substantially flat wall for resting against a ground 12 and at the top by an inclined wall 13 for bearing against the wheel, generally delineating a curved profile, and by an inclined back wall 14 presenting a convergent inclination towards the wall for bearing against the wheel 13. In alternative embodiments not shown, the back wall 14 is made orthogonal to the wall for resting against the ground 12.

In particular, the wall for bearing against the wheel 13 has a wheel sliding/rolling impediment portion 13a, hereinafter "blocking portion 13a", and a wheel receiving portion 13b. In particular, the receiving portion 13b adjoins the wall for resting against the ground 12 and defines with it 12 a tip 17 of the wedge-shaped body 11. Generally, the receiving portion 13b corresponds substantially to a first third of the surface adjoining the wall for resting against the ground 12, while the blocking portion 13a corresponds to the remaining two thirds of the surface 13 located more proximal to the back wall 14.

The blocking portion 13a of the wall for bearing against the wheel 13 is configured to prevent the wheel from sliding or rolling along the wheel, while effectively returning any thrust exerted by the wheel to the ground. To this end, in the first shown embodiment, the blocking portion 13a has a curvature dimensioned in accordance with the static wheel diameter of the vehicle for which the wheel chock device is designed.

The use of the wheel chock device 10 in association with wheels of the design diameter ensures that under stress-free conditions of use, the wheel actually engages only the receiving portion 13b of the bearing wall 13. On the contrary, in case of use under stress, the wheel engages the entire bearing wall 13, thus unloading the weight of the entire vehicle against the portion of the wall that actually holds it, that is the blocking portion 13a.

In the first embodiment shown in FIGS. 1-3, the wheel chock device 10 is of the collapsible type i.e. comprising a wedge-shaped body 11 defined by two movable body sections 11a which can assume a first close configuration, in which they outline a compact wedge-shaped body, and a second spaced-apart configuration, in which they outline an extended wedge-shaped body (shown in FIG. 1). The extended configuration allows the device to be used to validly block a wheel of a vehicle, while the compact configuration is particularly suitable for storing the device 10 when not in use.

In particular, each body section 11a has a configuration characterized by a substantially flat wall for resting against the ground 12, an inclined wall 13 for bearing against the wheel, generally delineating a curved profile, and an inclined back wall 14 presenting a convergent inclination towards the wall for bearing against the wheel 13. The wall for bearing against the wheel 13 adjoins the wall for resting against the ground 12 at a tip 17 of the respective body section 11a. Further, in each body section 11a, the wall for bearing against the wheel 13 has a blocking portion 13a of the wheel and a wheel receiving portion 13b.

The two body sections 11a are fastened to each other in a rotatable manner around a pivot element 21 that is common to the two body sections 11a, which pivot element 21 engages in respective tubular seats 22 defined by each body section 11a. The rotation of the two body sections 11a around the pivot 21 allows to pass from the close configuration, in which the two body sections 11a are arranged substantially parallel and side-by-side with each other, to the spaced-apart configuration in which the two body sections 11a are arranged rotated and crossed relative to each other, as shown in FIG. 1.

The pivot element 21 extends between the wall for resting against the ground 12 and the wall for bearing against the wheel 13 of each body section 11a according to an arrangement substantially parallel to the back wall 14. In particular, the pivot element 21 reaches the wall for bearing against the wheel 13 of the two body sections 11a at the respective blocking portion 13a.

The pivot element 21 is shaped to exhibit sufficient strength to effectively return to the ground a thrust exerted by the wheel of a vehicle resting against the same 21. The pivot element 21 is preferably hollow in order to ensure overall lightness and handling of the wheel chock device 10. By way of example, the pivot element 21 may be made as a steel tube, while the body sections 11a may be made of a plastic material.

At the position where the pivot element 21 reaches the wall for bearing against the wheel 13, there is provided, according to the present invention, a breakage element 29 constrained to the pivot element 21 so that it protrudes beyond a surface 23 defined by the maximum penetration depth of the tyre 30 in the pivot element 21, depicted in FIG. 4.

By "surface of maximum penetration depth 23" it is meant the virtual surface which, due to its own elastic deformation, the wheel tyre 30 reaches inside a hollow support element—such as, for example, the pivot element 21 present in the wheel chock device 10 according to the embodiment of FIGS. 1-3—when, in engagement with the wheel chock device 10, is pushed by the weight of the vehicle against it.

Specifically in the embodiment of FIG. 1-3, the breakage element 29 is constrained to the pivot element 21 so that it protrudes beyond the wall for bearing against the wheel 13. In the alternative embodiment shown in FIG. 5, the breakage element 29 is constrained to the pivot element 21 so that it protrudes beyond the surface 23 defined by the maximum penetration depth of the tyre 30 shown in FIG. 4, but does not protrude beyond the wall for bearing against the wheel 13.

Being constrained to the pivot element 21, the breakage element 29 is located at the blocking portion 13a of the body sections 11a and is configured to irreversibly deform under the weight of the vehicle wheel when it engages the blocking portion 13a. In particular, the breakage element 29 is characterized by a compressive breaking load comprised between 35 kg and 150 kg, preferably between 40 kg and 110 kg.

As better shown in FIG. 3, the breakage element 29 is made as a closure inserted into the hollow pivot element 21. The breakage element 29 includes a cylindrical body 29a with a section complementary to the section of the pivot element 21 in order to be accommodated within the pivot element 21, and an enlarged section upper cap 29b configured to abut against a termination of the pivot element 21 that reaches from the wall for bearing against the wheel 13.

In particular, the upper cap 29b comprises at least one protrusion 29c configured to extend beyond the surface 23 defined by the maximum penetration depth when the breakage element 29 is inserted into the pivot element 21.

In the embodiment of FIG. 3, the protrusion 29c develops on a half of the upper cap 29b positioned further away from the receiving portion 13b. The protrusion 29c forms a continuous upper closure membrane.

In the alternative embodiment of FIG. 6, the breakage element 29' is made as an open insert inserted into the hollow pivot element 21. In this case, the protrusion 29'c has a ferrule-like perimeter conformation and contours an opening 29'd that develops for a half of the upper cap 29'b positioned further away from the receiving portion 13b.

Again, in the alternative embodiment of FIG. 7, the breakage element 29" is made as a closure provided with a protrusion 29"c on the upper cap 29"b which uniformly develops over substantially the entire cap 29"b.

Preferably, the breakage elements 29,29',29" configured as a closure or insert comprise non-releasable constraint means (not shown) such as, for example, snap-on constraint means in order to ensure retention thereof within the pivot element 21, thereby preventing possible replacement following breakage.

FIGS. 8 and 9 show a third embodiment of a wheel chock device 10 according to the present invention.

In the third embodiment, the wedge-shaped body 11 advantageously comprises a plurality of elongated support structures 15 extending between the wall for resting against the ground 12 and the wall for bearing against the wheel 13, helping to delineate the latter 13. In the shown embodiment, the wall for bearing against the wheel 13 formed by the support structures 15 has a curved profile.

The elongated support structures 15 have sufficient strength to effectively return to the ground a thrust exerted by the wheel of a vehicle resting against them 15. At the same time, the support structures 15 advantageously have a hollow tubular conformation to ensure overall lightness and handling of the wheel chock device 10. This determines that, when resting, the tyre partially penetrates inside the support structures 15 due to its own elastic deformation of the wheel, reaching a virtual surface indicated with surface of maximum penetration depth (not shown with reference to the third form of embodiment since it is analogous to the first embodiments).

The support structures 15 are arranged side-by-side parallel to and joined to adjacent support structures 15 by means of connecting walls 16 that advantageously extend parallel to and for nearly the entire extension of the support structures 15. The connecting walls 16 contribute to a further overall lightening of the wheel chock device 10, while preserving the strength and rigidity thereof.

In particular, in the shown embodiment, the support structures 15 are arranged in longitudinal and transverse rows. The height of the support structures 15 gradually decreases to delineate the wedge-shaped profile of the body 11, converging in the tip 17 of the body 11.

Finally, a gripping handle 18 connected to the wedge-shaped body 11 at the back wall 14 is provided.

According to the present invention, there is provided at least one breakage element 19 protruding from the surface defined by the maximum penetration depth at the blocking portion 13a of the wall for bearing against the wheel 13 of the wedge-shaped body and configured to yield and break, i.e., irreversibly deform, under the weight of the vehicle wheel. In particular, the breakage element 19 is characterized by a compressive breaking load comprised between 35 kg and 150 kg, preferably between 40 kg and 110 kg.

In the embodiment of FIGS. 8 and 9, the breakage element 19 appears to protrude even beyond the wall for bearing against the wheel 13, however in alternative embodiments (not shown), said breakage element 19 may be integrated into said wall for bearing against the wheel 13, thus resulting flush with said wheel 13. In still other embodiments (not shown), the breakage element 19 may be made slightly recessed with respect to the wall for bearing against the wheel 13.

As better shown in FIG. 8a, in the third shown embodiment, the breakage element 19 is made as a ring protruding from a first end of a plurality of support structures 15 that contribute to forming the blocking portion 13a of the wall for bearing against the wheel 13. In detail, in the shown embodiment, the breakage element 19 is made on two support structures 15 forming a row adjoining the back wall 14 of the wedge-shaped body 11.

In alternative embodiments (not shown), the breakage element 19 may be obtained on a greater or lesser number of support structures 15. Furthermore, the breakage element 19 may be obtained on intermediate support structures 15, i.e., not adjoining the back wall 14, but still defining at least part of the blocking portion 13a of the wall for bearing against the wheel 13.

In the shown embodiment, the protruding ring 19 is made in one piece with the respective support structure 15 from which it protrudes, as an axial extension thereof, thereby protruding from the blocking portion 13a of the wall for bearing against the wheel 13. The wall forming the protruding ring 19 has a lower thickness than the thickness of the support structure 15, in particular a thickness configured to yield/deform irreversibly under the weight of the vehicle wheel.

With reference to FIGS. 10 and 11, a fourth embodiment of the wheel chock device 10 is shown. Again, the wedge-shaped body 11 is formed by a plurality of elongated support structures 15 extending between the wall for resting against the ground 12 and the wall for bearing against the wheel 13, converging in the tip 17 of the body 11, joined to adjacent support structures 15 by means of connecting walls 16.

As better shown in FIG. 10a, also in the fourth embodiment there is provided at least one breakage element 19' protruding from the surface of the wedge-shaped body at the blocking portion 13a of the wall for bearing against the wheel 13 and configured to irreversibly deform under the weight of the vehicle wheel.

Unlike the embodiment of FIGS. 8 and 9, the fourth embodiment comprises two closure-configured breakage elements 19' each inserted into a respective support structure 15.

In this case, the breakage element 19' is not made in one piece with respect to the support structure 15 but as a separate element that can be constrained to a support structure 15. In particular, the closure-configured breakage element 19' comprises non-releasable restraint means (not shown) such as snap-on constraint means in order to ensure that the breakage element 19' cannot be replaced following breakage.

Such an embodiment is particularly useful for converting already manufactured state-of-the-art wheel chock devices into wheel chock device 10 according to the present invention.

The invention claimed is:

1. A wheel chock device, comprising:
   a wedge-shaped body defined by at least one substantially flat wall for resting against a ground and, at the top, at least one wall for bearing against a wheel, inclined with respect to the wall for resting against the ground, the wall for bearing against the wheel adjoining the wall for resting against the ground at a tip of the wedge-shaped body, the wall for bearing against the wheel comprising a blocking portion distal from the tip, configured to block a movement of the wheel, and a wheel receiving portion proximal to the tip;
   the wheel chock device further comprising at least one breakage element constrained to the wedge-shaped body so as to interfere with a wheel engaged against the blocking portion of the wall for bearing against the wheel, the at least one breakage element being configured to at least partially irreversibly deform when a wheel engages the blocking portion of the wedge-shaped body;
   wherein the breakage element is constrained or integrated in the blocking portion of the wall for bearing against the wheel so as to protrude with respect to a surface defined by the maximum penetration depth of a wheel inside the wedge-shaped body or so as to protrude with respect to the wall for bearing against the wheel.

2. The wheel chock device according to claim 1, wherein the at least one breakage element is characterized by a compressive breaking load comprised between 35 kg and 150 kg.

3. The wheel chock device according to claim 1, wherein:
   the wedge-shaped body comprises a plurality of elongated support structures which extend between the wall for resting against the ground and the wall for bearing against the wheel;
   a first end of the support structures contributes to forming the wall for bearing against the wheel; and
   the at least one breakage element is made as an extension of at least one support structure whose end contributes to form the blocking portion of the wall for bearing against the wheel.

4. The wheel chock device according to claim 3, wherein the at least one breakage element is made in one piece with at least one support structure and as annular extension of said at least one support structure.

5. The wheel chock device according to claim 3, wherein the at least one breakage element is made as an extension of at least one support structure adjoining a back wall of the wedge-shaped body.

6. The wheel chock device according to claim 3, wherein the at least one breakage element is made as an extension of at least two support structures whose end contributes to forming the blocking portion of the wall for bearing against the wheel.

7. The wheel chock device according to claim 3, wherein the elongated support structures are arranged side-by-side parallel to each other and joined to adjoining support structures by means of connecting walls advantageously extending parallel to and for nearly the entire extension of the support structures.

8. The wheel chock device according to claim 3, wherein the extension of the at least one support structure is made as a membrane, capsule or ferrule.

9. The wheel chock device according to claim 3, wherein the at least one breakage element is made as a closure insertable into the first end of the at least one support structure, with the at least one support structure made as a hollow tubular element.

10. The wheel chock device according to claim 1, wherein the blocking portion of the wall for bearing against the wheel, distal from the tip, extends at least two-thirds of the wall for bearing against the wheel or for at least half of the wall for bearing against the wheel.

11. The wheel chock device according to claim 1, wherein the at least one breakage element comprises non-releasable constraint means configured to ensure connection of the at least one breakage element to the wedge-shaped body.

12. A wheel chock device, comprising:
   a wedge-shaped body defined by at least one substantially flat wall for resting against a ground and, at the top, at least one wall for bearing against a wheel, inclined with respect to the wall for resting against the ground, the wall for bearing against the wheel adjoining the wall for resting against the ground at a tip of the wedge-shaped body, the wall for bearing against the wheel comprising a blocking portion distal from the tip, configured to block a movement of the wheel, and a wheel receiving portion proximal to the tip;
   the wheel chock device further comprising at least one breakage element constrained to the wedge-shaped body so as to interfere with a wheel engaged against the blocking portion of the wall for bearing against the wheel, the at least one breakage element being configured to at least partially irreversibly deform when a wheel engages the blocking portion of the wedge-shaped body,
   wherein the wedge-shaped body comprises two body sections fastened to each other in a rotatable manner around a common pivot element so as to be movable between a first closed configuration, in which the two body sections outline a compact wedge-shaped body, and a second spaced-apart configuration, in which the two body sections outline an extended wedge-shaped body, the pivot element extending between the wall for resting against the ground and the wall for bearing against the wheel of each body section, and, with a first termination, reaching the wall for bearing against the wheel at the blocking portion, the breakage element being constrained to the pivot element.

13. The wheel chock device according to claim 12, wherein the breakage element is made as a closure or as an insert provided with an axial through opening, and wherein the breakage element is insertable into the first termination of the pivot element, with the pivot element being made as hollow cylinder.

14. The wheel chock device according to claim 12, wherein the breakage element comprises a cylindrical body with a section complementary to a section of the pivot element and an upper cap configured to abut against the termination of the pivot element which reaches the wall for bearing against the wheel.

15. The wheel chock device according to claim 14, wherein the upper cap comprises at least one protrusion configured to extend beyond a surface defined by the maximum penetration depth of a wheel inside the pivot element or beyond to the wall for bearing against the wheel, when the breakage element is inserted in the pivot element.

16. The wheel chock device according to claim 15, wherein the at least one protrusion is made as a membrane, capsule or ferrule.

17. The wheel chock device according to claim 15, wherein the at least one protrusion develops on an upper cap half positioned further away from the receiving portion.

18. The wheel chock device according to claim 15, wherein the at least one protrusion has a perimeter conformation and contours an opening that develops for an upper cap half positioned further away from the receiving portion.

* * * * *